(12) United States Patent
Motohashi et al.

(10) Patent No.: US 8,564,913 B2
(45) Date of Patent: Oct. 22, 2013

(54) DRIVING DEVICE FOR SEMICONDUCTOR ELEMENT

(75) Inventors: Satoru Motohashi, Matsumoto (JP); Akira Nakamori, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 324 days.

(21) Appl. No.: 13/170,812

(22) Filed: Jun. 28, 2011

(65) Prior Publication Data
US 2011/0317315 A1    Dec. 29, 2011

(30) Foreign Application Priority Data

Jun. 28, 2010 (JP) .............................. 2010-146158

(51) Int. Cl.
*H02H 7/00* (2006.01)
*H02H 9/00* (2006.01)
*H02H 3/20* (2006.01)
*H02H 9/04* (2006.01)

(52) U.S. Cl.
USPC ............................ 361/18; 361/91.1; 361/93.1

(58) Field of Classification Search
USPC ........................................................... 361/18
See application file for complete search history.

(56) References Cited

U.S. PATENT DOCUMENTS

| | | | | |
|---|---|---|---|---|
| 5,115,388 | A * | 5/1992 | Shigekane | 363/56.03 |
| 6,404,659 | B1 * | 6/2002 | Oyabe | 363/132 |
| 6,459,380 | B1 | 10/2002 | Watanabe et al. | |
| 6,934,139 | B2 * | 8/2005 | Kumagai et al. | 361/103 |
| 2002/0039269 | A1 | 4/2002 | Kumagai et al. | |

FOREIGN PATENT DOCUMENTS

| | | |
|---|---|---|
| JP | 03-247114 A | 11/1991 |
| JP | 07-154986 A | 6/1995 |
| JP | 08-070580 A | 3/1996 |
| JP | 2000-341960 A | 12/2000 |
| JP | 2002-027665 A | 1/2002 |
| JP | 2007-082360 A | 3/2007 |
| JP | 2007-324828 A | 12/2007 |

* cited by examiner

*Primary Examiner* — Dharti Patel
(74) *Attorney, Agent, or Firm* — Rossi, Kimms & McDowell LLP

(57) ABSTRACT

A driving device for driving a semiconductor element can include a plurality of protection circuits that detect information necessary for performing protection operation for semiconductor elements that include a power conversion apparatus, a pulse signal generation circuit that sets a pulse sequence signal with a pulse width differently for each of the protection circuits and outputs a pulse sequence signal corresponding to the protection circuit that has been first detected a need for protection operation. The device can also include an alarm signal forming circuit that forms an alarm signal by ON-OFF control of a switching element and externally outputs the alarm signal, and a protection operation state discrimination circuit that discriminates existence of a protection operation state based on the alarm signal from the alarm signal forming circuit, and an alarm control circuit that delivers the pulse sequence signal outputted from the pulse signal generation circuit.

5 Claims, 4 Drawing Sheets

41 Input circuut
46 Projection operation state discrimination circuit
47 Alarm control
54 Logic circuit
55 Pulse sequence signal generation circuit

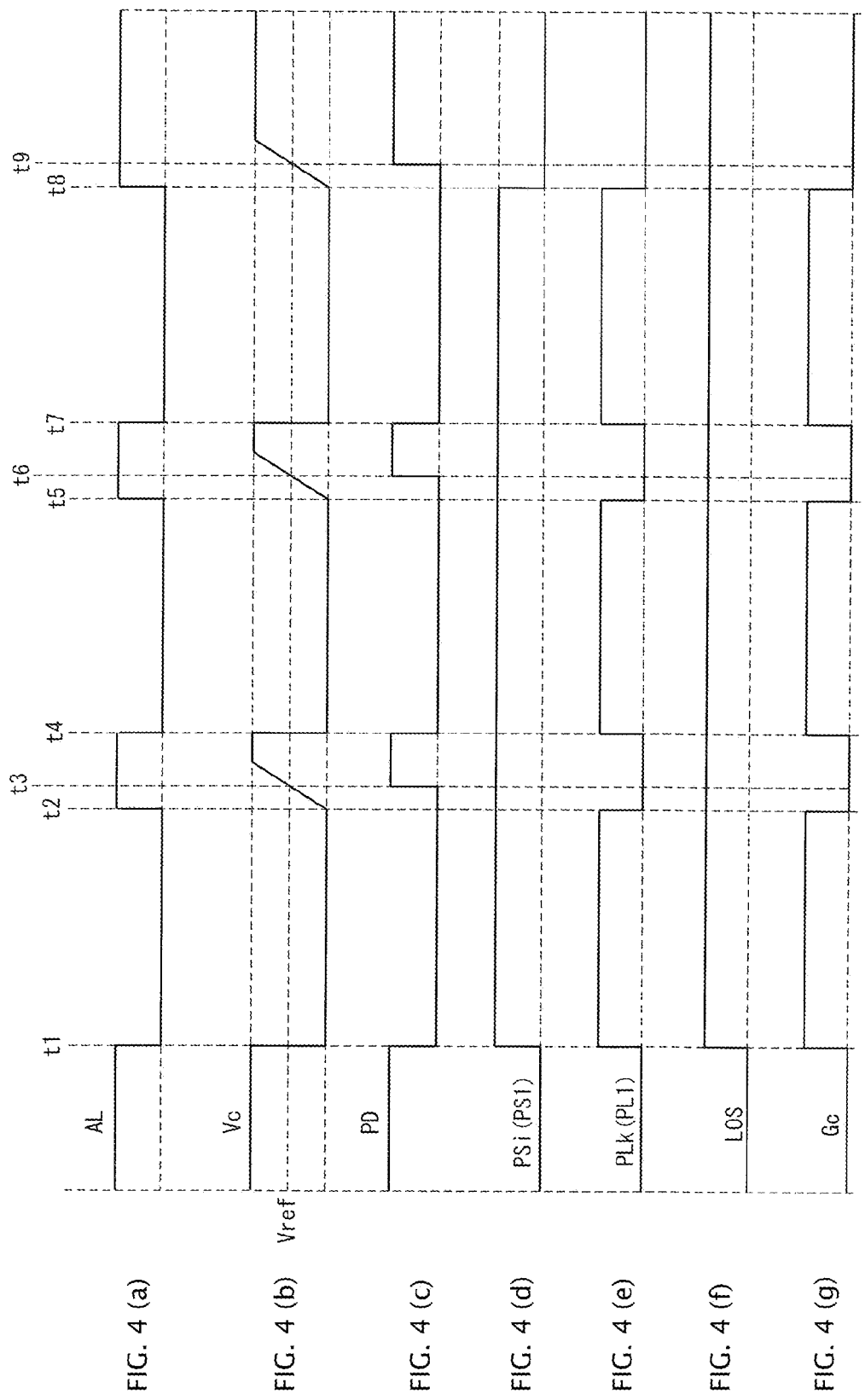

DRIVING DEVICE FOR SEMICONDUCTOR ELEMENT

BACKGROUND OF THE INVENTION

1. Field of the Invention

Embodiments of the present invention relate to a driving device for a semiconductor element that drives a semiconductor element composing a power conversion apparatus, for example, and has a protection operation discriminating function.

2. Description of the Related Art

A related type of driving device for a semiconductor element is disclosed in Japanese Unexamined Patent Application Publication No. H08-070580 (also referred to herein as "Patent Document 1"), for example. The driving device comprises an alarm circuit that is provided for an intelligent power module (IPM) that is a power transistor module for driving an inverter, and comprises an overcurrent alarm means, an overvoltage alarm means, and an overheat alarm means.

In the conventional example disclosed in Patent Document 1, the overcurrent alarm means outputs a first alarm signal having a first pulse width upon detection of an overcurrent state of a power transistor; the overvoltage alarm means outputs a second alarm signal having a second pulse width on detection of an overvoltage state at an output terminal of the power transistor; and the overheat alarm means outputs a third alarm signal having a third pulse width on detection of an overheat state of the power transistor. As a result, detection of the pulse width of the outputted alarm signal is sufficient to discriminate among an overcurrent state, an overvoltage state, and an overheat state.

Another driving device for a semiconductor element is disclosed in Japanese Unexamined Patent Application Publication No. 2002-027665 (also referred to herein as "Patent Document 2"). The driving device in an intelligent power module comprises: necessary number of semiconductor switching elements, a driving circuit, various types of detection circuits for detecting serious abnormality and precursor abnormality of the switching elements and the driving circuit, and warning circuits corresponding to the detection circuits, an abnormality detecting logic circuit for protection operation of the switching elements upon detection of abnormality by these detection circuits, a control circuit for externally outputting the signals based on the abnormality detection signals, and a transmission circuit.

In the conventional example disclosed in Patent Document 2, the transmission circuit has an output terminal that outputs an alarm signal upon detection of serious abnormality and an output terminal that outputs an abnormality factor discrimination signal indicating factors for the serious abnormality and the precursor abnormality. Preferably, these two types of terminals are shared to form a single common output terminal.

Japanese Unexamined Patent Application Publication No. 2000-341960 (also referred to herein as "Patent Document 3") discloses another intelligent power module that is a semiconductor device comprising, in an integrated body, IGBTs composing a power conversion bridge circuit of the inverter apparatus, an IGBT 1DB for switching a current for dissipating regenerative electric power of a motor in a regenerative resistance, and a pre-driver containing driving circuits and protective circuits for respective IGBTs. The protective circuit of the driving device for a semiconductor element in the intelligent power module outputs an alarm signal ALM1 in an abnormal condition through an alarm enable line to outside of the intelligent power module. However, prior to the alarm ALM1, the protective circuit outputs a precaution alarm ALM2 through a precaution alarm line to outside of the intelligent power module without shut-down of the IGBT when discrimination of precursor to abnormality occurrence is made based on detection of a collector current in the IGBT or a chip temperature that is a predetermined value higher than the normal value but lower than a level to issue the alarm ALM1.

In the conventional example disclosed in Patent Document 1, individual detection is made on overcurrent abnormality, overvoltage abnormality and overheat abnormality in the power transistors composing the inverter, and first, second and third alarm signals having different pulse widths are outputted externally. Consequently, detection of pulse width allows discrimination among the overcurrent abnormality, overvoltage abnormality and overheat abnormality. However, each of the overcurrent alarm means, overvoltage alarm means, and the overheat alarm means functions as a one-shot multi-vibrator upon detection of the overcurrent abnormality, an overvoltage abnormality, or overheat abnormality and outputs one alarm signal with a predetermined pulse width. As a result, if an alarm signal is outputted from any other alarm means simultaneously with the alarm means in operation or before the alarm signal of the alarm means in operation returns to ON state, an alarm signal is erroneously detected. That is one of unsolved problems.

The conventional example disclosed in Patent Document 2 needs to output two types of signals of an alarm signal and an abnormality factor discriminating signal, which results in a complicated structure of a signal forming circuit. That is another unsolved problem.

In the conventional example disclosed in Patent Document 3, the protection circuit outputs an alarm ALM1 externally through an alarm enable line on an event of abnormality. The protection circuit makes a decision that a sign of generating an abnormality is detected when the collector current of an IGBT or the chip temperature exceeds a predetermined level which is higher than a normal level but lower than an abnormal level to deliver the alarm ALM1 and outputs a precaution alarm ALM2 externally through a precaution alarm line. This protection circuit cannot make discrimination between collector current abnormality and chip temperature abnormality, but only determines that the IGBT is in a condition where an abnormality has been generated or there exist a sign of generating an abnormality. Thus, the device of Patent Document 3 cannot make discrimination among abnormality factors. That is another largely unsolved problem.

SUMMARY OF THE INVENTION

Embodiments of the present invention have been accomplished in view of one or more of the above-described unsolved problems in the conventional examples and an object of embodiments of the invention is to provide a driving device for a semiconductor element that performs accurate discrimination whether each of a plurality of protective circuits is in a protective operation condition or not, based on the pulse width.

In order to attain the above object, a driving device for a semiconductor element of an embodiment according to the present invention is a driving device for a semiconductor element to individually drive a semiconductor element composing a power conversion apparatus, the driving device comprising: a plurality of protection circuits that detect information necessary for performing protection operation for the semiconductor element; a pulse signal generation circuit that sets pulse sequence signals with a pulse width differently for each of the plurality of protection circuits, and outputs a pulse sequence signal corresponding to the protection circuit that has been first detected a need for protection operation delivering continuously in a time period of the detection of a need for protection operation; an alarm signal forming circuit that forms an alarm signal by ON-OFF control of a switching element included in the alarm signal forming circuit and externally outputs the alarm signal; a protection operation state discrimination circuit that discriminates existence of a protection operation state based on the alarm signal from the alarm signal forming circuit and outputs a protection operation discrimination signal; and an alarm control circuit that delivers the pulse sequence signal outputted from the pulse signal generation circuit to a control terminal of the switching element in the alarm signal forming circuit based on the discrimination by the protection operation state discrimination circuit.

According to this construction, the pulse signal generation circuit sets pulse sequence signals with a pulse width differently for each of the plurality of protection circuits and outputs a pulse sequence signal corresponding to the protection circuit that has been first detected a need for protection operation. The protection operation state discrimination circuit discriminates existence of a protection operation state with the alarm signal from the alarm signal forming circuit. If the discrimination does not indicate existence of a protection operation state, the alarm control circuit delivers the pulse sequence signal outputted from the pulse signal generation circuit to the switching element in the alarm signal forming circuit to generate an alarm signal.

Since this alarm signal is a pulse sequence signal having a different pulse width for each of the plurality of protection circuits, measurement of the pulse width of the alarm signal by an external device makes it possible to recognize the protection circuit that has detected the protection operation state. Because the pulse sequence signal from the pulse signal generation circuit has the pulse width corresponding to the protection circuit that has first detected a need for a protection operation, mixture of pulse sequence signals is inhibited and erroneous detection in the external control device is avoided without failure.

A driving device for a semiconductor element of another aspect of embodiment according to the present invention is the driving device for a semiconductor element, wherein the alarm signal forming circuit comprises a series-connected circuit consisting of a pull-up resistor and the switching element, the series-connected circuit being inserted between a control power supply terminal and a ground terminal, and a connection point between the pull-up resistor and the switching element is connected to the protection operation state discrimination circuit and to an alarm terminal for outputting the alarm signal externally.

According to this construction, in which the pull-up resistor and the switching element are connected in series, the alarm signal is at the high level when the switching element is in an OFF state, and the alarm signal is at the low level when the switching element is in an ON state.

A driving device for a semiconductor element of another aspect of embodiment according to the present invention is the driving device for a semiconductor element, wherein the protection operation state discrimination circuit comprises a charging-discharging circuit including a capacitor that is charged when the alarm signal is at the high level and discharged when the alarm signal is at the low level, and a comparator that compares a charged voltage of a capacitor in the charging-discharging circuit with a reference voltage and outputs a protection operation discrimination signal.

According to this construction, the charging-discharging circuit is charged or discharged corresponding to the high level or the low level of the alarm signal. When the alarm signal is at the low level, with a discrimination of existence of a protection operation in another protection circuit, the comparator outputs a protection operation discrimination signal (at the low level, for example) indicating a protection operation state. As a result, delivery of the pulse sequence signal from the pulse signal generation circuit to the switching element in the alarm signal forming circuit is blocked to inhibit output of the alarm signal. On the other hand, when the alarm signal is at the high level, with a discrimination of non-existence of protection operation in other protection circuits, the comparator outputs a protection operation discrimination signal (at the high level, for example) indicating inactivity in a protection operation state. As a result, delivery of the pulse sequence signal from the pulse signal generation circuit to the switching element in the alarm signal forming circuit is permitted to output the alarm signal.

A driving device for a semiconductor element of another aspect of embodiment according to the present invention is the driving device for a semiconductor element, wherein the alarm control circuit comprises a latching circuit that latches the protection operation discrimination signal from the protection operation state discrimination circuit when the pulse sequence signal is delivered from the pulse signal generation circuit, and a logical product circuit that receives a latched output signal of the latching circuit and the pulse sequence signal delivered from the pulse signal generation circuit, and delivers a logical product output of the logical product circuit to a control terminal of the switching element in the alarm signal forming circuit.

According to this construction, when the protection circuit detects a state necessary for a protection operation, the latch circuit latches the protection operation discrimination signal. When the protection operation discrimination signal indicates existence of a protection operation state, the logical product circuit stops outputting of the pulse sequence signal, and when the protection operation discrimination signal indicates non-existence of protection operation state, the logical product circuit permits outputting of the pulse sequence signal.

A driving device for a semiconductor element of another embodiment according to the present invention is the driving device for a semiconductor element, wherein alarm terminals of the alarm signal forming circuits in the driving devices for driving the semiconductor elements that construct lower arms of the power conversion apparatus are made in contact with each other.

According to this construction, when an alarm signal is outputted from any one of the driving devices for the semiconductor elements for driving the semiconductor elements composing the lower arm of the power conversion apparatus, the alarm signals from other driving devices for semiconductor elements are inhibited.

In a driving device for a semiconductor element according to the invention, the driving device for driving each of the semiconductor elements composing a power conversion apparatus has a plurality of protection circuits for detecting information necessary for protection operation for the semiconductor element, and a pulse sequence signal having a pulse width different for each of the plurality of protection circuits is inhibited to output simultaneously. Therefore, the present invention has an effect that the protection circuits are accurately discriminated by the pulse width of the pulse sequence signal and erroneous detection of a protection operation state is avoided.

By mutually connecting every alarm terminal of the driving devices for a plurality of semiconductor elements composing the lower arm of the power convertor apparatus, when a state necessary for protection operation is detected in a driving device for a semiconductor element and an alarm signal is outputted, any alarm signal from the other driving devices for a semiconductor element is inhibited to output, thereby avoiding overlapping of alarm signals between the driving devices for a semiconductor element.

BRIEF DESCRIPTION OF DRAWINGS

FIGS. 4(a), 4(b), 4(c), 4(d), 4(e), 4(f), and 4(g) show signal waveforms for illustrating operation of a driving device for a semiconductor element according to the invention.

DETAILED DESCRIPTION OF THE INVENTION

Some aspects of preferred embodiments will be described in the following with reference to the accompanying drawings.

Figure 1:
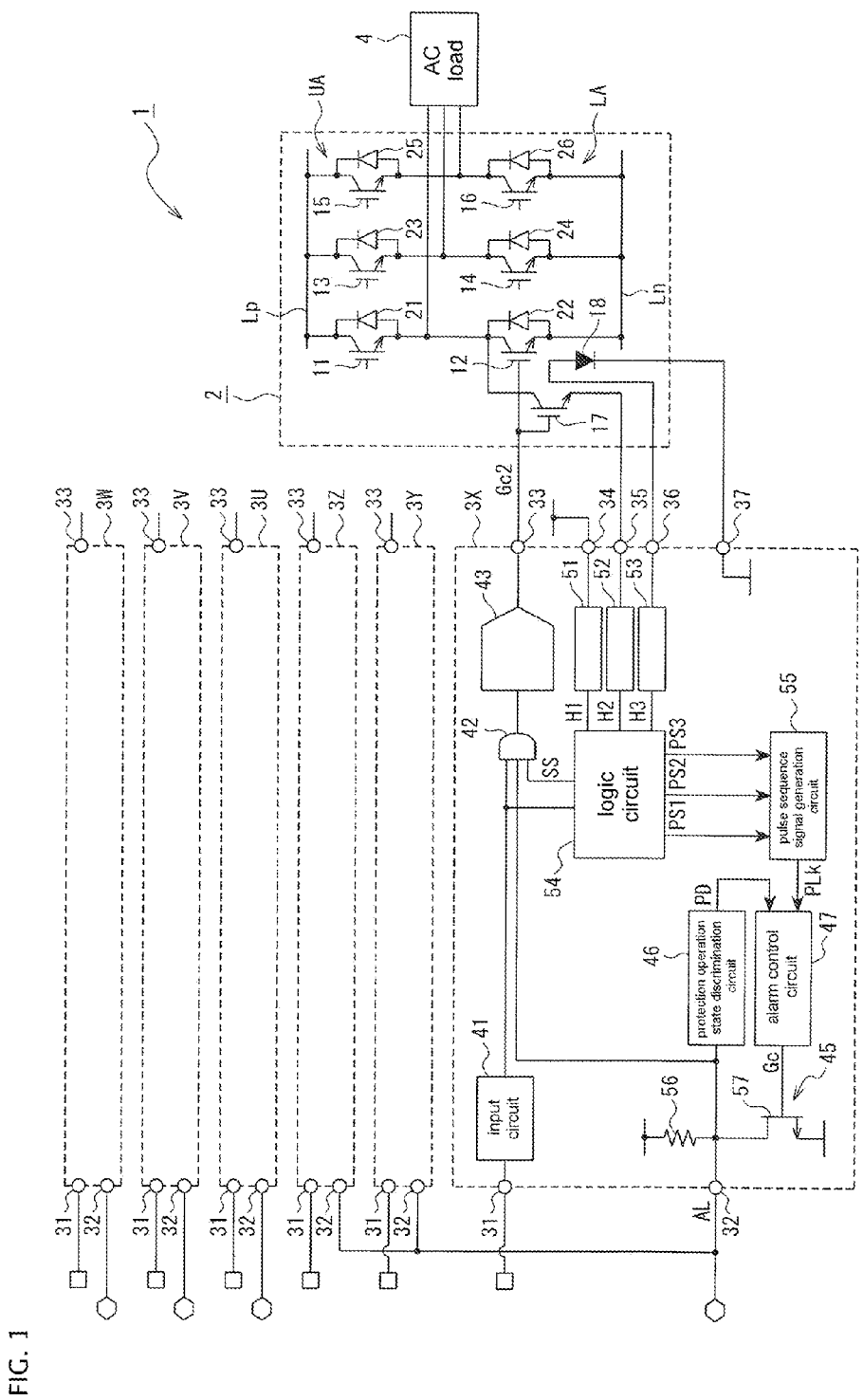
FIG. 1 is a block diagram of a power conversion apparatus to which a driving device for a semiconductor element of an embodiment according to the present invention is applied.

FIG. 1 is a block diagram of a power conversion apparatus to which a driving device for a semiconductor element of an embodiment according to the present invention is applied. Referring to FIG. 1, the power conversion apparatus 1 comprises an inverter 2 that converts DC power to AC power and driver ICs 3U through 3Z for phases, which are driving devices for semiconductor elements for individually driving semiconductor elements for the phases composing the inverter 2.

The inverter 2 has six IGBTs (insulated gate bipolar transistors) 11 through 16, which are semiconductor elements. A series-connected circuit of IGBTs 11 and 12, a series-connected circuit of IGBTs 13 and 14, and a series-connected circuit of IGBTs 15 and 16 are connected between a positive line Lp and a negative line Ln that are connected to a DC power supply and supplied with DC power, the series-connected circuits being connected in parallel with each other. The IGBTs 11 through 16 are connected to free-wheeling diodes 21 through 26 in anti-parallel connection.

An upper arm UA is composed of IGBTs 11, 13, and 15 of U-phase, V-phase and W-phase, respectively; and a lower arm LA is composed of IGBTs 12, 14, and 16 of X-phase, Y-phase, and Z-phase. A three phase AC power is delivered from the connection point between the IGBTs 11 and 12, the connection point between the IGBTs 13 and 14, and the connection point between the IGBTs 15 and 16. The three phase AC power is supplied to an AC load 4 such as an electric motor.

Each of the IGBTs 11 through 16 accompanies, as shown representatively for the IGBT 12 in FIG. 1, a current sensing IGBT 17 for detecting an electric current running between a collector and an emitter of each of the IGBTs 11 through 16 and a temperature detecting diode 18 embedded in the same chip as of each IGBT. The collector of the current sensing IGBT 17 is connected to the collector of the IGBT 12 and the gate of the current sensing IGBT 17 is connected to the gate of the IGBT 12.

The driver ICs 3U through 3Z have the same construction that is representatively illustrated by the driver IC 3X for driving the IGBT 12 that composes the lower arm LA of the inverter 2. This driver IC 3X comprises: an input terminal 31 that receives a pulse width modulation signal for gate driving from an external control device (not shown in FIG. 1), an alarm terminal 32 that outputs an alarm signal to the external control device, an output terminal 33 that outputs a gate driving signal to the gate of the IGBT 12 of the inverter 2, a voltage input terminal 34 that receives a driver power supply voltage, a current input terminal 35 that is connected to the emitter of the current sensing IGBT 17 of the inverter 2, an overheat detection terminal 36 that is connected to the anode of the temperature detecting diode 18 of the inverter 2, and a power ground terminal 37 that is connected to the cathode of the temperature detecting diode 18.

The pulse width modulation signal inputted to the input terminal 31 is subjected to a signal processing including waveform shaping in the input circuit 41 and supplied to the input side of the AND gate 42. An output from the AND gate 42 is amplified by the amplifier 43 and delivered as a gate driving signal to the gate driving signal output terminal 33.

The alarm terminal 32 connects to an alarm signal forming circuit 45. The alarm signal AL formed in the alarm signal forming circuit 45 is supplied to a protection operation state discrimination circuit 46. A protection operation discrimination signal PD outputted from the protection operation state discrimination circuit 46 is delivered to an alarm control circuit 47.

The voltage input terminal 34 is connected to a low voltage protection circuit 51 for detecting a low voltage state in which a voltage of a driver IC power supply for the driver ICs 3X through 3Z is lower than a predetermined voltage.

As for the driver ICs 3U through 3W, a driver IC power supply is provided for each of the driver ICs 3U through 3W and each individual driver IC power supply is connected to a low voltage protection circuit 51 for detecting a low voltage state in which a voltage of a driver IC power supply for each of the driver ICs 3U through 3W is lower than a predetermined voltage. The low voltage protection circuit 51 outputs a protection operation signal H1 that turns to a high level when the power supply voltage of the driver IC power supply lowers to a voltage lower than a low voltage threshold value.

The current input terminal 35 receives the electric current running in the current sensing IGBT 17 and is connected to an overcurrent protection circuit 52 for detecting an overcurrent state. The overcurrent protection circuit 52 outputs a protection operation signal H2 that turns to a high level upon detection of an overcurrent state in which the current in the current sensing IGBT 17 is larger than an overcurrent threshold value.

The overheat detection terminal 36 receives a voltage drop between terminals of the temperature detecting diode 18 and is connected to an overheat protection circuit 53 for detecting the temperature in the chip. This overheat protection circuit 53 detects a chip temperature based on the voltage drop between the terminals of the temperature detecting diode 18 and outputs a protection operation signal H3 that turns to a high level when the detected chip temperature is higher than a predetermined threshold value.

The protection operation signals H1, H2 and H3 outputted from the low voltage protection circuit 51, the overcurrent protection circuit 52, and the overheat protection circuit 53 are delivered to a logic circuit 54. The logic circuit 54 receives a pulse width modulation signal outputted from the input circuit 41. When any one of the protection operation signals H1, H2 and H3 turns to the high level in a state during the pulse width modulation signal is inputted, the logic circuit 54 delivers a driving stop signal SS at a low level to the input side of the AND gate 42 and identifies the protection operation signal H1, H2 or H3 that has first turned to the high level. Corresponding to the identified protection operation signal Hi (i=1, 2, or 3), the logic circuit 54 delivers a pulse sequence output command signal PSi to a pulse signal generation circuit 55. The pulse sequence output command signal PSi is kept at a high level during the protection operation signal Hi is at a high level.

The pulse signal generation circuit 55, upon receiving the pulse sequence output command signal PSi, outputs a pulse sequence signal having a varied pulse width corresponding to the pulse sequence output command signal PSi to an alarm control circuit 47. The pulse signal generating circuit 55 receives the pulse sequence output command signal PS1 at a high level from the logic circuit 54 according to the output of the protection operation signal H1 upon detection of a low voltage of the IC power supply by the low voltage protection circuit 51. During the pulse sequence output command signal PS1 is kept at a high level, the pulse signal generating circuit 55 outputs a pulse sequence signal PL1 with a pulse width of a basic pulse width T and a pulse interval of Ta that is shorter than the basic pulse width T, for example, as shown in FIG. 2(a).

The pulse signal generation circuit 55 receives the pulse sequence output command signal PS2 at a high level from the logic circuit 54 according to the output of the protection operation signal H2 upon detection of an overcurrent state of the IGBT 12 by the over current protection circuit 52. During the pulse sequence output command signal PS2 is kept at a high level, the pulse signal generating circuit 55 outputs a pulse sequence signal PL2 with a pulse width of 2T, for example, and a pulse interval of Ta as shown in FIG. 2(b).

The pulse signal generation circuit 55 receives the pulse sequence output command signal PS3 at a high level from the logic circuit 54 according to the output of the protection operation signal H3 upon detection, by the overheat protection circuit 53, of an overheat state in which the temperature of the chip containing the IGBT 12 is higher than a predetermined overheat threshold value. During the pulse sequence output command signal PS3 is kept at a high level, the pulse signal generating circuit 55 outputs a pulse sequence signal PL3 with a pulse width of 4T, for example, and a pulse interval of Ta as shown in FIG. 2(c).

The pulse interval Ta of the pulse sequence signals PL1, PL2, and PL3 is selected to be longer than the time necessary for a charge-discharge capacitor 70 in a protection operation state discrimination circuit 46 (described afterwards) to charge up from a discharged state to a charged voltage of a reference voltage Vref.

The alarm signal forming circuit 45 has a structure, as shown in FIG. 1, comprising a pull-up resistor 56 and a switching element of NMOS-FET 57 series connected between a power supply terminal and the ground. The connection point between the pull-up resistor 56 and the NMOS-FET 57 is connected to the alarm terminal 32, the input side of the AND gate 42, and the protection operation state discrimination circuit 46.

Figure 3:
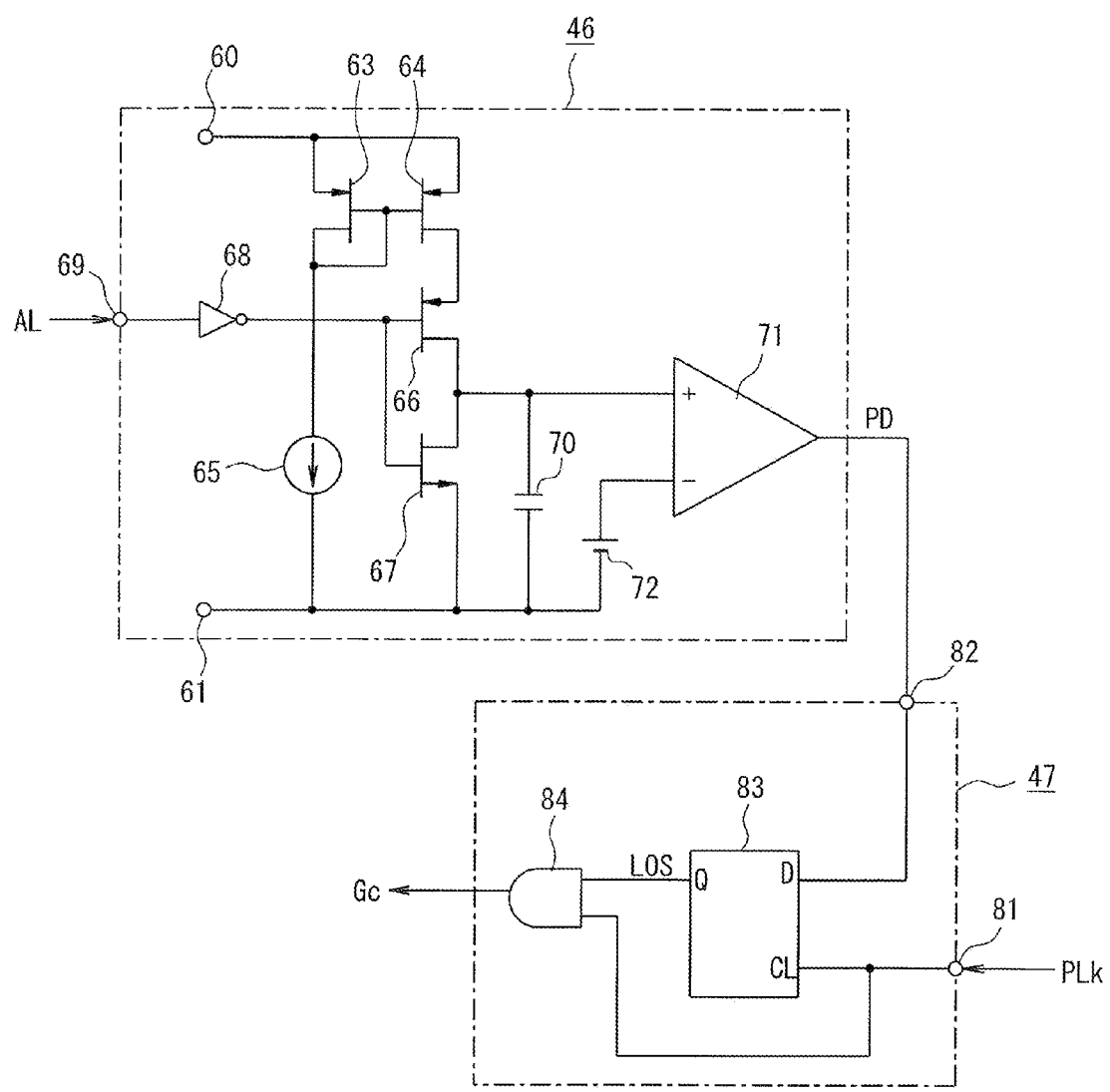
FIG. 3 is a circuit diagram showing specific construction of the protection operation state discrimination circuit and the alarm control circuit.

The protection operation state discrimination circuit 46 comprises, as shown in FIG. 3, a current mirror circuit connected between a positive side power supply terminal 60 and a negative side power supply terminal 61. The current mirror circuit comprises two PMOS-FETs 63, 64 that have a source connected to the positive side power supply terminal 60 and the gates thereof connected with each other, a constant current source 65 that is inserted between the PMOS-FET 63 and the negative side power supply terminal 61 in series connection, and a PMOS-FET 66 and an NMOS-FET 67 that are inserted between the PMOS-FET 64 and the negative side power supply terminal 61 in series connection. The gate terminals of the PMOS-FETs 63 and 64 are connected to the drain terminal of the PMOS-FET 63.

Gate terminals of the PMOS-FET 66 and the NMOS-FET 67 are connected through a logical inversion circuit 68 to an input terminal 69 to which an alarm signal AL is inputted from the alarm signal forming circuit 45.

A charging-discharging capacitor 70 is connected in parallel to the NMOS-FET 67 between a source and a drain thereof. A node between the capacitor 70 and the connection point between the PMOS-FET 66 and the NMOS-FET 67 is connected to a non-inversion input side of a comparator 71. An inversion input side of the comparator 71 is connected to a reference voltage source 72 set at a voltage lower than the IC power supply voltage. The comparator 71 outputs a compared output at a high level when the voltage at the non-inversion input side is higher than the voltage of the reference voltage source 72; and outputs a compared voltage at a low level when the voltage at the non-inversion input side is lower than the voltage of the reference voltage source 72. The compared output is delivered to the alarm control circuit 47 as a protection operation discrimination signal PD.

The alarm control circuit 47, as shown in FIG. 3, has an input terminal 81 to which a pulse sequence signal PLk (k=1, 2, or 3) from the pulse signal generating circuit 55 is inputted and an input terminal 82 to which the protection operation discrimination signal PD is inputted. The input terminal 82 is directly connected to a data input terminal D of a D type flip-flop 83, which is a latching circuit, and the input terminal 81 is connected to a clock input terminal CL of the D type flip-flop 83. An output terminal Q of the D type flip-flop 83 and the input terminal 81 are connected to the input side of an AND gate 84, which is a logical product circuit. A logical product output from the AND gate 84 is delivered to the gate of the NMOS-FET in the alarm signal forming circuit 45 as a gate driving signal Gc.

The alarm terminals 32 of the X-phase driver IC 3X, the Y-phase driver IC 3Y, and the Z-phase driver IC 3Z for driving three IGBTs 12, 14, and 16 that compose the lower arm LA of the inverter 2 are connected with each other in outside of the driver ICs and connecting to a control device (not shown in the figures).

Now, operation of the device of the aspect of embodiment according to the invention described above will be described in the following.

Normal conditions are assumed at this moment, in which electric current values in the IGBTs 11 through 16 composing the inverter 2 are lower than the overcurrent threshold value; the temperature inside the chip containing the IGBTs 11 through 16 is lower than the overheat threshold value; and the IC power supply voltage supplied to the driver ICs 3U through 3Z is lower than the low voltage threshold value.

In this normal state, the protection operation signals H1, H2, and H3 outputted from the low voltage protection circuit 51, the overcurrent protection circuit 52, and the overheat protection circuit 53 of the driver IC 3U through 3Z are at the low level, and the driving stop signal SS outputted from the logic circuit 54 is at the high level. All of the pulse sequence output command signals PS1, PS2, and PS3 outputted towards the pulse signal generating circuit 55 are kept at the low level resulting in the pulse sequence signal output inhibited state in which none of the pulse sequence signals PL1 through PL3 is outputted from the pulse signal generating circuit 55.

In addition, it is assumed that the NMOS-FET 57 in the alarm signal forming circuit 45 is in the OFF state and the alarm signal AL delivered to the alarm terminal 32 is kept at the high level as shown in FIG. 4(a).

In the protection operation state discrimination circuit 46 in this state, on account of the low level output from the logical inverter circuit 68, PMOS-FET 66 is in an ON state and the NMOS-FET 67 is in an OFF state. As a result, a constant current is supplied from the current mirror circuit through the PMOS-FET 66 to the charging-discharging capacitor 70, making the charging-discharging capacitor 70 into a charged condition. Thus, the charged voltage Vc as shown in FIG. 4(b) exceeds the reference voltage Vref of the reference voltage source 72, the reference voltage Vref being indicated by the dotted line in FIG. 4(b). Therefore, the protection operation discrimination signal PD, which is the compared output from the comparator 71, is kept at the high level as shown in FIG. 4(c).

In the alarm control circuit 47, the protection operation state discrimination signal PD delivered from the protection operation state discrimination circuit 46 is at the high level and the pulse sequence signal PLk inputted from the pulse signal generation circuit 55 is kept at the low level as shown in FIG. 4(e). As a consequence, the D-type flip-flop 83 keeps the previous output state (of the low level, for example), and the gate driving signal Gc that is an output of the AND gate 84 is at the low level as well, as shown in FIG. 4(g).

Therefore, the NMOS-FET 57 in the alarm signal forming circuit 45 is kept in the OFF state, and the alarm signal AL is kept at the high level as shown in FIG. 4(a).

In other driver ICs 3Y and 3Z, in the conditions of a normal IC power supply voltage, normal electric current values in the IGBTs 14 and 16 in the inverter 2, and a normal chip temperature, the output alarm signals AL from the alarm terminals 32 of the driver ICs 3Y and 3Z are both at the high level.

In each of the driver ICs 3X, 3Y, and 3Z, a pulse width modulated signal delivered from a control device (not illustrated) to the input terminal 31 is subjected to a signal processing in the input circuit 41, transferred through the AND gate 42, and amplified in the amplifier 43. A gate driving signal outputted from the amplifier 43 is delivered to the IGBTs 11 through 16 of the inverter 2, where DC power is converted into AC power, which is supplied to an AC load 4.

An event of low voltage abnormality is assumed to occur from the normal state of the IGBTs 11 through 16 of the phases of the inverter 2 and the normal condition of the IC power supply voltage in the X-phase driver IC 3X for driving the IGBT 12 of the X-phase. When the IC power supply voltage supplying the driver IC 3X drops below the low voltage threshold value, this low voltage abnormality is detected by the low voltage protection circuit 51.

Then, a protection operation signal H1 at the high level is delivered from the low voltage protection circuit 51 to the logic circuit 54. The logic circuit 54, upon receipt of the protection operation signal H1 at the high level, changes the driving stop signal SS from the high level to the low level. As a result, the pulse width modulated signal outputted from the input circuit 41 is interrupted at the AND gate 42 and the gate driving signal Gc2 delivered from the amplifier 43 to the gate of the IGBT 12 of the inverter 2 turns to the low level, thereby immediately stopping the driving operation of the IGBT 12.

At the same time, the pulse sequence output command signal PS1 at the high level is delivered from the logic circuit 54 to the pulse signal generation circuit 55 at the time t1 as indicated in FIG. 4(d) corresponding to the protection operation of the low voltage protection circuit 51.

Accordingly, the pulse signal generation circuit 55 starts to deliver the pulse sequence signal PL1 with a pulse width T, which corresponds to the low voltage protection operation, to the alarm control circuit 47 at the time t1 as shown in FIG. 4(e).

In the alarm control circuit 47, upon receipt of the pulse sequence signal PL1 into the clock input terminal CL of the D-type flip-flop 83, the protection operation discrimination signal PD at the high level is latched at the moment of rising up of the pulse sequence signal PL1 and the latch output signal LOS outputting from the output terminal Q is reversed from the low level to the high level as shown in FIG. 4(f).

The AND gate 84, receiving this latch output signal LOS, simultaneously receives the pulse sequence signal PL1 at the other input terminal of the AND gate 84 from the pulse signal generation circuit 55 in the same form as it is outputted at the pulse signal generation circuit 55. As a consequence, the gate driving signal Gc outputted from the AND gate 84 is reversed from the low level to the high level as shown in FIG. 4(g).

The gate driving signal Gc delivered to the gate of the NMOS-FET 57 of the alarm signal forming circuit 45 controls the NMOS-FET 57 to the ON state. Accordingly, the alarm signal AL is reversed from the high level to the low level as shown in FIG. 4(a).

The alarm signal AL, upon reversal from the high level to the low level, reverses the output from the logical inversion circuit 68 of the protection operation state discrimination circuit 46 to the high level, thereby turns the PMOS-FET 66, which has been in the ON state, into the OFF state. At the same time, the NMOS-FET 67, which has been in the OFF state, turns into the ON state. As a result, the charges accumulated in the charging-discharging capacitor 70 are discharged through the NMOS-FET 67.

As a consequence, the charging voltage Vc delivered to the non-inversion input side of the comparator 71 abruptly drops to a value lower than the reference voltage Vref as shown in FIG. 4(b). Accordingly, the protection operation discrimination signal PD, which is a compared output from the comparator 71, is reversed from the high level to the low level as shown in FIG. 4(c).

This protection operation discrimination signal PD at the low level is delivered to the data input terminal D of the D-type flip-flop 83. Since the pulse sequence signal PL1 delivered to the clock input terminal CL of the D-type flip-flop 83 is kept at the high level, the latch output signal LOS outputting from the output terminal Q of the D-type flip-flop 83 is maintained at the high level as shown in FIG. 4(f).

As a consequence, the pulse sequence signal PL1 at the high level, passing through the AND gate 84 in the form as original one, is delivered to the gate of the NMOS-FET 57 of the alarm signal forming circuit 45 as a gate driving signal Gc. Therefore, the alarm signal AL is kept at the low level as shown in FIG. 4(a).

After that, at the time t2 when the pulse sequence signal PL1 outputted from the pulse signal generation circuit 55 is reversed to the low level as shown in FIG. 4(e), although the latch output signal LOS outputted from the output terminal Q of the D-type flip-flop 83 is maintained at the high level, the gate driving signal Gc outputted from the AND gate 84 is reversed to the low level as shown in FIG. 4(g). Accordingly, the NMOS-FET 57 of the alarm signal forming circuit 45 turns to the OFF state, thereby making the alarm signal AL returned to the high level as shown in FIG. 4(a).

Consequently, the PMOS-FET 66 turns to the ON state and the NMOS-FET 67 returns to the OFF state in the protection operation state discrimination circuit 46 to start charging of the charging-discharging capacitor 70. At the time t3 when the charging voltage Vc increases reaching the reference voltage Vref, the protection operation discrimination signal PD outputted from the comparator 71 returns to the high level as shown in FIG. 4(*c*).

At this moment t3, however, the pulse sequence signal PL1 outputted from the pulse signal generation circuit 55 is kept at the low level and thus, the latch output signal LOS outputted from the output terminal Q of the D-type flip-flop 83 in the alarm control circuit 47 is maintained at the high level as shown in FIG. 4(*f*).

After that, at the time t4 when the pulse sequence signal PL1 outputted from the pulse signal generation circuit 55 reverses to the high level, the D-type flip-flop 83 accordingly latches the protection operation discrimination signal PD. Nevertheless, because of the high level of this protection operation discrimination signal PD, the latch output signal LOS outputted from the output terminal Q of the D-type flip-flop 83 is maintained at the high level.

As a result of the reversal of the gate driving signal Gc outputted from the AND gate 84 into the high level at the time t4 as shown in FIG. 4(*g*), the NMOS-FET 57 of the alarm signal forming circuit 45 turns to the ON state and the alarm signal AL is reversed to the low level as shown in FIG. 4(*a*).

After that, the operation processes from the time t1 to the time t4 described above are repeated during the low voltage condition is continuously detected in the low voltage protection circuit 51 and the pulse sequence output command signal PS1 outputted from the logic circuit 54 continues to be at the high level as shown in FIG. 4(*d*).

When the alarm signal AL of the X-phase driver IC 3X is reversed from the high level to the low level at the time t1, the alarm signals AL of the alarm signal forming circuits 45 of the Y-phase driver IC 3Y and the Z-phase driver IC 3Z, the alarm terminals 32 of which are connected to the alarm terminal of the X-phase driver IC 3X, are also reversed to the low level. These low level signals are delivered to the AND gates 42 of the driver ICs 3Y and 3Z, thereby stopping delivery of the gate driving signal to the Y-phase IGBT 14 and the Z-phase IGBT 16. At the same time, the protection operation discrimination signals PD outputted from the comparators 71 of the protection operation state discrimination circuits 46 in the Y-phase driver IC 3Y and the Z-phase driver IC 3Z are reversed to the low level as described for the X-phase driver IC 3X. These protection operation discrimination signals PD at the low level is inputted to the input terminal D of the D-type flip-flop 83 of the alarm control circuits 47. As a consequence, even if any one of the protection circuits 51 through 53 in at least one of the Y-phase driver IC 3Y and the Z-phase driver IC 3Z detects a condition necessary for a protection operation to output a pulse sequence signal PLk from the pulse signal generation circuit 55 and input it to the clock input terminal CL of the D-type flip-flop 83, the latch output signal LOS outputted from the output terminal Q of the D-type flip-flop 83 is maintained at the low level. Therefore, output of the gate driving signal Gc from the AND gate 84 is inhibited.

Consequently, the only alarm signal AL delivered to the control device (not illustrated in the figures) connected to the alarm terminals 32 is the alarm signal that is outputted from the X-phase driver IC 3X. Therefore, measurement of the pulse width of the alarm signal AL in the control device allows accurate recognition that the protection operation is the low voltage protection operation.

After that, at the time t8 when the IC power supply voltage returns to a value higher than the low voltage threshold value, the protection operation signal H1 outputted from the low voltage protection circuit 51 returns to the low level corresponding to the restoration of the IC power supply voltage. Accordingly, the driving stop signal SS restores the high level in the login circuit 54 and delivery of the pulse width modulated signal to the amplifier 43 restarts through the AND gate 42. Therefore, delivery of the gate driving signal restarts to the gate of the X-phase IGBT 12 of the inverter 2.

Since, in the alarm control circuit 47, the pulse sequence signal PL1 outputted from the pulse signal generation circuit 55 is in the state continuously at the low level, the gate driving signal Gc outputted from the AND gate 84 reverses to the low level at the time t8 as shown in FIG. 4(*g*). Corresponding to the reversal, the NMOS-FET 57 of the alarm signal forming circuit 45 turns into the OFF state, and thus, the alarm signal AL restores the high level as shown in FIG. 4(*a*).

In the protection operation state discrimination circuit 46, the change of the alarm signal AL to the high level turns the PMOS-FET 66 to the ON state and the NMOS-FET to the OFF state. As a result, the charging-discharging capacitor 70 starts to be charged increasing the charged voltage Vc as shown in FIG. 4(*b*) until reaching the reference voltage Vref at the time t9 and the protection operation discrimination signal PD outputted from the comparator 71 returns to the high level from the low level as shown in FIG. 4(*c*). However, since the pulse sequence signal PLk, which is another input to the D-type flip-flop 83 of the alarm control circuit 47, does not rise up, the latch output signal LOS outputted from the output terminal Q stays in the state at the high level.

When the other driver IC 3Y or 3Z detects an abnormality and becomes a protection operation state changing the alarm signal AL to the low level, the protection operation discrimination signal PD outputted from the comparator 71 of the protection operation state discrimination circuit 46 in the driver IC 3X changes to the low level. As a result, when any one of the protection circuits 51, 52, and 53 in the driver IC 3X outputs one of the protection operation signals H1, H2, and H3 and the logic circuit 54 outputs a pulse sequence output command signal PSi at the high level, the pulse signal generation circuit 55 outputs the pulse sequence signal PLk. At the time of rising up of the pulse sequence signal PLk, the gate driving signal Gc outputted from the AND gate 84 of the D-type flip-flop 83 in the alarm control circuit 47 does not change to the high level because of reversal of the latch output signal LOS outputted from the output terminal Q of the D-type flip-flop 83 into a low level. Accordingly, the alarm signal AL is inhibited to output.

Figure 2:
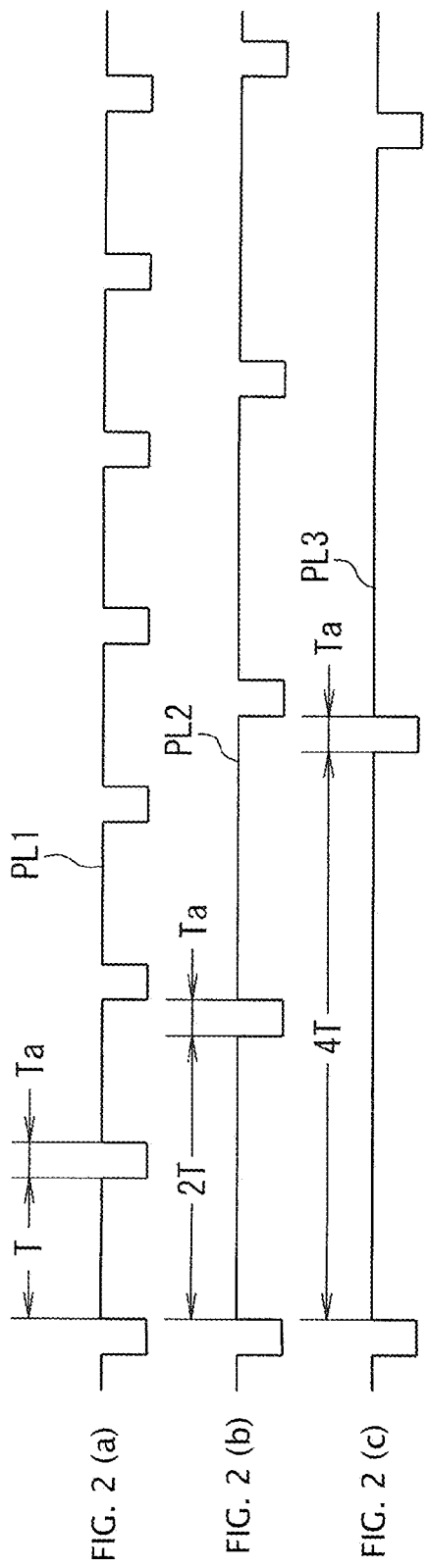
FIGS. 2(a), 2(b), and 2(c) show waveforms of pulse signals outputted from a pulse signal generating circuit in FIG. 1.

When the overcurrent protection circuit 52 in the X-phase driver IC 3X detects overcurrent in the X-phase IGBT 12 composing the inverter 2 in the state of the alarm signal AL at the high level, the logic circuit 54 delivers the driving stop signal SS at the low level to the AND gate 42 to stop delivery of the gate driving signal to the gate of the X-phase IGBT 12. At the same time, the logic circuit 54 delivers the pulse sequence output command signal PS2 to the pulse signal generation circuit 55, which in turn outputs the pulse sequence signal PL2 as shown in FIG. 2(*b*) to the alarm control circuit 47. Consequently, the alarm signal AL in the reversed form of the pulse sequence signal PL2 is delivered from the alarm terminal 32 to the control device (not depicted in the figures). By measuring the pulse width of the alarm signal AL in the control device, accurate recognition can be accomplished that the overcurrent protection operation is active.

Similarly, when the overheat protection circuit 53 detects, in the condition of the alarm signal AL at the high level, that the temperature inside the chip containing the X-phase IGBT 12 composing the inverter 2 is higher than the overheat threshold value, the logic circuit 54 delivers the driving stop signal SS at a low level to the AND gate 42 to stop output of the gate driving signal to the X-phase IGBT 12. At the same time, the logic circuit 54 delivers the pulse sequence output command signal PS3 to the pulse signal generation circuit 55, which accordingly delivers the pulse sequence signal PL3 as shown in FIG. 2(c) to the alarm control circuit 47. Consequently, the alarm signal AL in the reversed form of the pulse sequence signal PL3 is delivered from the alarm terminal 32 to the control device (not depicted in the figures). By measuring the pulse width of the alarm signal AL in the control device, accurate recognition can be accomplished that the overheat protection operation is active.

Preferably, the pulse interval Ta in the pulse sequence signal PL1, PL2, and PL3 generated in the pulse signal generation circuit 55 is set so as to be slightly longer than the time during the charging voltage Vc of the charging-discharging capacitor 70 in the protection operation state discrimination circuit 46 rises from the discharged condition to the reference voltage Vref, in order to limit the pulse width for holding the high level condition of the protection operation discrimination signal PD outputted from the comparator 71 in the protection operation state discrimination circuit 46 to the necessary minimum value. This setting of the pulse interval Ta suppresses occurrence of interruption when a driver IC becomes a protection operation state in the condition of another driver IC in a protection operation.

In the embodiment described above, when the protection circuit 51, 52, or 53 outputs a protection operation signal H1, H2, or H3 at the high level, the pulse signal generation circuit 55 outputs a pulse sequence signal PL1, PL2, or PL3 with a pulse width that is different depending on the protection operation signal H1, H2, and H3. The pulse sequence signals PL1, PL2, and PL3 discriminate the state of the alarm signal AL in the protection operation state discrimination circuit 46 whether a protection operation state is active or not. Based on this protection operation discrimination signal, the alarm signal is controlled whether it is to be outputted or not corresponding to the pulse sequence signal PL1, PL2, or PL3. As a consequence, simultaneous output of the alarm signal is inhibited when another phase driver IC outputs an alarm signal AL. Therefore, only one alarm signal AL is delivered to the control device. Since the alarm signal is not changed, detection of occurrence of a protection operation state and discrimination of the type of protection operation are accurately accomplished based on single alarm signal AL.

In the above-described embodiment, the invention is applied to an inverter as a power conversion apparatus. However, the invention can be applied not only to the inverter but also to a converter for converting AC power to DC power and any power conversion apparatuses containing a semiconductor element. Although the invention has been described on the embodiment applied to a three phase power conversion apparatus, the invention can be applied to a single phase power conversion apparatus as well.

In the embodiment described above, the pulse widths of the pulse sequence signals generated in the pulse signal generation circuit 55 are a basic pulse width of T, 2T, and 4T. However, any other set of pulse widths can be used that are different from each other and can be discriminated by a control device.

In the embodiment described above, the protection operation state discrimination circuit 46 is constructed using an analogue circuit. However, the protection operation state discrimination circuit 46 can be constructed using a digital circuit including a counter that counts inputted clock signal and further, using software processing by an arithmetic processing unit such as a microcomputer. Such software processing can treat the alarm control circuit 47 as well as the protection operation state discrimination circuit 46.

In the embodiment described above, the alarm signal AL is at the high level in the normal state. The alarm signal AL is not limited to this situation but can be so set to be at the low level in the normal state and at the high level at the time of protection operation. In that case, the signal level is reversed in the protection operation state discrimination circuit 46 and the alarm control circuit 47.

In the embodiment described above, the semiconductor element is an IGBT. However, the semiconductor element is not limited to the IGBT but also can be any semiconductor element such as a power FET.

In the embodiment described above, current detection is conducted by means of a current sensing IGBT 17 for detecting the current in the IGBTs 11 through 16. However, current detection is not limited to this means but can be performed using a shunt resistor or a current transformer.

In the embodiment described above, the types of abnormality are a low voltage of the IC power supply, overcurrent of the IGBT, and overheat of the IGBT. However, detection and protection operation can be conducted for two of the three above-mentioned types of abnormality. Moreover, a protection circuit can be provided to detect another state that needs protection operation such as overvoltage.

The switching element composing the protection operation state discrimination circuit 46 is not limited to the MOS-FET but can also be another switching element such as a bipolar transistor.

In the embodiment described above, the pulse interval Ta of the pulse sequence signal PLk generated in the pulse signal generation circuit 55 is set to be longer than the time span from the discharged state of the charging voltage Vc of the charging-discharging capacitor 70 to attainment of the reference voltage Vref. However, the pulse interval Ta of the pulse sequence signal PLk generated in the pulse signal generation circuit 55 can also be set to be shorter than the time span from the discharged state of the charging voltage Vc of the charging-discharging capacitor 70 to attainment of the reference voltage Vref. In that case, an output of the gate driving signal Gc due to other driver IC is surely avoided if the protection operation discrimination signal PD is kept at the low level in the time period of synchronization of the alarm signal AL with the pulse sequence signal PLk. In order to achieve this situation, the system is so constructed that the gate driving signal Gc based on the pulse sequence signal PLk is allowed to output solely in the alarm control circuit 47 to which the pulse sequence signal PLk is first delivered in the condition of the alarm signal AL at the high level, and that the gate driving signal Gc returns to the low level when the input of the pulse sequence signal PLk is stopped.

In short, the pulse sequence signal PLk from the pulse signal generation circuit 55 is delivered to the switching element of the alarm signal forming circuit 45 when the alarm control circuit 47 indicates that the protection operation discrimination signal PD from the protection operation state discrimination circuit 46 is not in a protection operation state.

This application is based on, and claims priority to, Japanese Patent Application No. 2010-146158, filed on Jun. 28, 2010. The disclosure of the priority application, in its entirety, including the drawings, claims, and the specification thereof, is incorporated herein by reference.

What is claimed is:

1. A driving device for a semiconductor element for individually driving a semiconductor element composing a power conversion apparatus, the driving device comprising:

a plurality of protection circuits that detect information necessary for performing protection operation for the semiconductor element;

a pulse signal generation circuit that sets pulse sequence signals with a pulse width differently for each of the plurality of protection circuits, and outputs a pulse sequence signal corresponding to the protection circuit that has been first detected a need for protection operation delivering continuously in a time period of the detection of a need for protection operation;

an alarm signal forming circuit that forms an alarm signal by ON-OFF control of a switching element included in the alarm signal forming circuit and externally outputs the alarm signal;

a protection operation state discrimination circuit that discriminates existence of a protection operation state based on the alarm signal from the alarm signal forming circuit and outputs a protection operation discrimination signal; and an alarm control circuit that delivers the pulse sequence signal outputted from the pulse signal generation circuit to a control terminal of the switching element in the alarm signal forming circuit based on the discrimination by the protection operation state discrimination circuit.

2. The driving device for a semiconductor element according to claim 1, wherein
the alarm signal forming circuit comprises a series-connected circuit consisting of a pull-up resistor and the switching element, the series-connected circuit being inserted between a control power supply terminal and a ground terminal, and a connection point between the pull-up resistor and the switching element is connected to the protection operation state discrimination circuit and to an alarm terminal for outputting the alarm signal externally.

3. The driving device for a semiconductor element according to claim 1, wherein
the protection operation state discrimination circuit comprises a charging-discharging circuit including a capacitor that is charged when the alarm signal is at the high level and discharged when the alarm signal is at the low level, and a comparator that compares a charged voltage of the capacitor in the charging-discharging circuit with a reference voltage and outputs a protection operation discrimination signal.

4. The driving device for a semiconductor element according to claim 1, wherein
the alarm control circuit comprises a latching circuit that latches the protection operation discrimination signal from the protection operation state discrimination circuit when the pulse sequence signal is delivered from the pulse signal generation circuit, and a logical product circuit that receives a latched output signal of the latching circuit and the pulse sequence signal delivered from the pulse signal generation circuit, and delivers a logical product output of the logical product circuit to a control terminal of the switching element in the alarm signal forming circuit.

5. The driving device for a semiconductor element according to claim 1, wherein
alarm terminals of the alarm signal forming circuits in the driving devices for driving the semiconductor elements that construct lower arms of the power conversion apparatus are made in contact with each other.

* * * * *